T. W. BRACHER.
The Method of Preparing Fabric for Cutting into Bias Strips.

No. 221,718.  Patented Nov. 18, 1879.

Witnesses.
Chas. Wahlers
William Miller

Inventor.
Thomas W. Bracher
by Van Santvoord & Hauff,
his Attys.

UNITED STATES PATENT OFFICE.

THOMAS W. BRACHER, OF NEW YORK, N. Y.

IMPROVEMENT IN THE METHODS OF PREPARING FABRICS FOR CUTTING INTO BIAS STRIPS.

Specification forming part of Letters Patent No. 221,718, dated November 18, 1879; application filed September 4, 1879.

*To all whom it may concern:*

Be it known that I, THOMAS W. BRACHER, of the city, county, and State of New York, have invented a new and useful Improvement in Cutting Goods or Fabrics Bias, which improvement is fully set forth in the following specification, reference being had to the accompanying drawings, in which—

Figure 1:
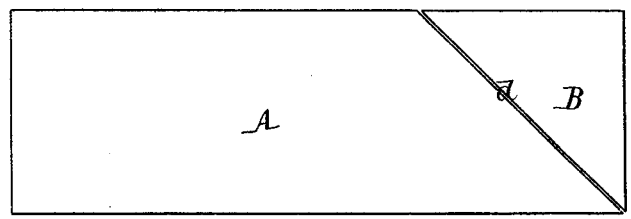
Figure 2:
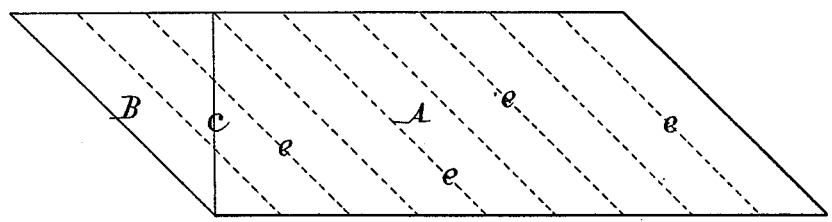

Figure 1 represents a piece of goods used in carrying out my invention. Fig. 2 shows the same in condition to be cut.

Similar letters indicate corresponding parts.

This invention relates to a method of preparing a piece of goods or fabric for forming into bias strips; and it consists in cutting a triangular piece from one end of a rectangular piece of goods, and joining the vertical side of such triangular piece to the other end thereof, whereby both ends of the piece of goods are rendered bias and one parallel to the other, and it is adapted to be cut into strips of equal length without waste of material.

In the drawings, the letter A designates a rectangular piece of woven goods or other fabrics, from one end of which is cut a triangle, B, which is joined to the other or straight end thereof, as at $c$, Fig. 2, according to my invention.

In carrying out my invention, I lay the piece of goods to be cut up on a table, and cut the same, as at $d$, Fig. 1, to separate therefrom the triangle B, using a gage and a knife for this purpose. The piece of goods used is cut from a roll, so that it possesses a rectangular, or substantially rectangular, shape.

I join the triangle cut off, as stated, to the other or straight end of the piece of goods by cement or other suitable means, as indicated in Fig. 2, placing the vertical edge of the triangle upon such end of the piece. In this manner both ends of the piece of goods are rendered bias and one end parallel to the other, so that the piece may be cut up into strips parallel to such ends, as indicated by the lines $e$, without waste.

Bias strips have heretofore been cut from a rectangular piece of goods; but a portion of the goods at each end of the piece went to waste, because the strips cut off at the ends were too short for practical use, and too short to compensate for the labor involved in joining them to form a longer strip. This is obviated by my invention.

My invention is especially adapted to the cutting of oil-silk or oil-cloth in the manufacture of sweat-bands for hats and caps, and a further step in the process is to join the bias strips cut from the piece of goods end to end, and to put up the same in form of a roll; another is, to subdivide the united strips by cutting the rolls crosswise, as with a paper-cutter, and, finally, to reel the narrow strips.

In joining the bias strips cut from oil silk or cloth, as well as in joining the triangle B to the piece, in goods of this nature, I scrape off the oiled surface-coating from one of the two edges to be joined, and then lap one edge over the other, with cement between them, thereby producing a thin lap-joint.

What I claim as new, and desire to secure by Letters Patent, is—

The method of preparing a piece of goods or fabric for forming into bias strips, which consists in cutting a triangular piece from one end of a rectangular piece of goods and joining the vertical side of such triangular piece to the other end thereof, thereby rendering both ends of the piece bias and one parallel to the other, and adapting it to be cut into strips of equal length without waste, substantially as described.

In testimony that I claim the foregoing I have hereunto set my hand and seal this 30th day of August, 1879.

T. W. BRACHER. [L. S.]

Witnesses:
    J. VAN SANTVOORD,
    CHAS. WAHLERS.